United States Patent [19]

Busch et al.

[11] Patent Number: 4,524,943
[45] Date of Patent: Jun. 25, 1985

[54] INJECTION MOLD

[75] Inventors: Peter Busch, Bochum; Karl-Heinz Barbet, Korschenbroich, both of Fed. Rep. of Germany

[73] Assignee: TRW Ehrenreich GmbH & Co. KG, Dusseldorf, Fed. Rep. of Germany

[21] Appl. No.: 514,734

[22] Filed: Jul. 18, 1983

[30] Foreign Application Priority Data

Jul. 31, 1982 [DE] Fed. Rep. of Germany ....... 3228748

[51] Int. Cl.³ ............................................. B29C 11/00
[52] U.S. Cl. ...................... 249/63; 264/334; 425/554; 425/577
[58] Field of Search ............ 249/63, 66 A, 66 C, 249/67, 160, 161, 162, 165; 264/318, 328.1, 328.3, 335, 513, 537, 538; 425/523, 533, 553, 554, 556, 577, 450.1, 451.7, 451.9, 468, DIG. 5, DIG. 129, DIG. 221

[56] References Cited

U.S. PATENT DOCUMENTS

| | | | |
|---|---|---|---|
| 2,966,702 | 1/1961 | Soubier | 425/533 |
| 3,016,579 | 1/1962 | Schlitzkus | 264/318 |
| 3,843,088 | 10/1974 | McLoughlin et al. | 425/DIG. 5 |
| 3,905,740 | 9/1975 | Lovejoy | 425/468 |
| 4,039,644 | 8/1977 | Saumsiegle et al. | 264/335 |
| 4,131,665 | 12/1978 | Bodson et al. | 264/335 |
| 4,155,698 | 5/1979 | Aichinger | 425/556 |
| 4,209,160 | 6/1980 | Vanotti | 264/318 |
| 4,375,948 | 3/1983 | von Holdt | 425/556 |

FOREIGN PATENT DOCUMENTS

| | | | |
|---|---|---|---|
| 2832177 | 2/1979 | Fed. Rep. of Germany . | |
| 51-96860 | 8/1976 | Japan | 264/335 |
| 314052 | 7/1956 | Switzerland | 249/63 |
| 707810 | 1/1980 | U.S.S.R. | 425/556 |

Primary Examiner—Jay H. Woo
Assistant Examiner—Mike McGurk
Attorney, Agent, or Firm—Martin A. Farber

[57] ABSTRACT

An injection mold for the manufacture of sealing elements consisting of elastic material and having undercuts, particularly sealing bellows for joints, for example ball joints in automotive vehicles, includes followers which are divided centrally in the longitudinal direction of the sealing element and form the outer contour. The mold has a core plunger which forms the inner contour and is divided into an upper core plunger part and a lower core plunger part which are movable relative to each other. The sealing element is removed from the foregoing parts after the opening of the followers. In order to be able to remove the sealing element automatically form the mold without the use of parting agent the followers are split in transverse direction into an upper and a lower pair of followers in the region between the inner undercut of smallest diameter and the outer undercut of smallest diameter. The pairs of followers being movable independently of each other for successive gripping of the sealing element during opening of the mold.

10 Claims, 4 Drawing Figures

INJECTION MOLD

The object of the invention is an injection mold for the manufacture of sealing elements of elastic material which have undercuts, particularly sealing bellows for joints, for instance ball joints for automotive vehicles. The mold has followers which are divided centrally in the longitudinal direction of the sealing elements and form the outer contour. The mold includes a core plunger which forms the inner contour and is divided into an upper core plunger part and a lower core plunger part which are movable relative to each other and from which the sealing element is removed after the opening of the followers.

Such an injection mold is known from West German OS No. 28 32 177. In that known injection mold, the sealing element having the undercuts is intended to be withdrawn together with the movable upper part of the core plunger from the stationary lower part of the core plunger after the opening of the centrally divided followers. Compressed air is blown simultaneously through the joint between the upper and lower parts of the core plunger. Since this joint between the upper and lower parts of the core plunger is located directly below one end of the sealing element, it is to be assumed that the compressed air seeks the path of least resistance and does not loosen the sealing element from the stationary lower core plunger. Removal by machine from the mold with this known injection mold can therefore only be successful if the lower core plunger part has been sprayed with a parting agent, for instance silicon. Since this parting agent frequently leads to inclusions of parting agent in the material of the sealing element, it is necessary, in the known injection mold, to subject all sealing elements to careful examination. Particularly in the case of more complicated forms of sealing elements having large undercuts, as is true in the case of multifold sealing bellows, production rejects of up to 50% result.

Starting from this prior art, the object of the invention is to create an injection mold by which sealing elements having undercuts can be manufactured economically and with a considerable reduction in rejects without the use of parting agent and without manual removal from the mold.

In order to achieve this purpose, there is proposed an injection mold of the above-indicated type in which the followers are divided in transverse direction into an upper and a lower pair of followers between the inner undercut of smallest diameter and the outer undercut of smallest diameter. The pairs of followers are movable independently of each other, and the lower core plunger part is guided in a shaped ejection sleeve which is movable relative to the lower core plunger part and the end surface of which forms a part of the outer contour of the end surface of the sealing element.

With an injection mold constructed in accordance with this technical teaching, the sealing element is produced by the cooperation of the two pairs of followers. The two core plunger parts and the shaped ejection sleeve can be ejected automatically in simple fashion in the manner that after the opening of the upper pair of followers the upper core plunger part is pulled out of the sealing element, the sealing element being retained in the injection mold by the lower pair of followers in combination with the lower core plunger part and the shaped ejection sleeve. After the opening then of the lower pair of followers, and a relative movement between the lower core plunger part and the shaped ejection sleeve, the final removal of the sealing element can then be automatically effected from the mold without any manual operation being required. With this mold-removal technique it is also no longer necessary to use a parting agent. Furthermore, excessive stresses on the sealing element upon its removal from the mold are avoided so that practically no rejects result any longer. The verification of the sealing elements which have been manufactured and removed from the mold can be limited to samplings.

Another important advantage of the injection mold developed in accordance with the invention resides finally also in the fact that due to the automatic removal of the sealing elements from the mold without the use of parting agents, the stress exerted on the sealing element is reduced and, thus, it is made possible to process softer material, for instance soft polyurethanes or polyamide elastomers. In addition to more economical manufacture by the reduction of rejects and the verifications inherent therein, the invention thus also results in a considerable increase in the materials which can be used for the manufacture of such sealing elements.

One embodiment of the injection device of the invention is shown diagrammatically in different operating positions in the drawing in which.

Figure 1:
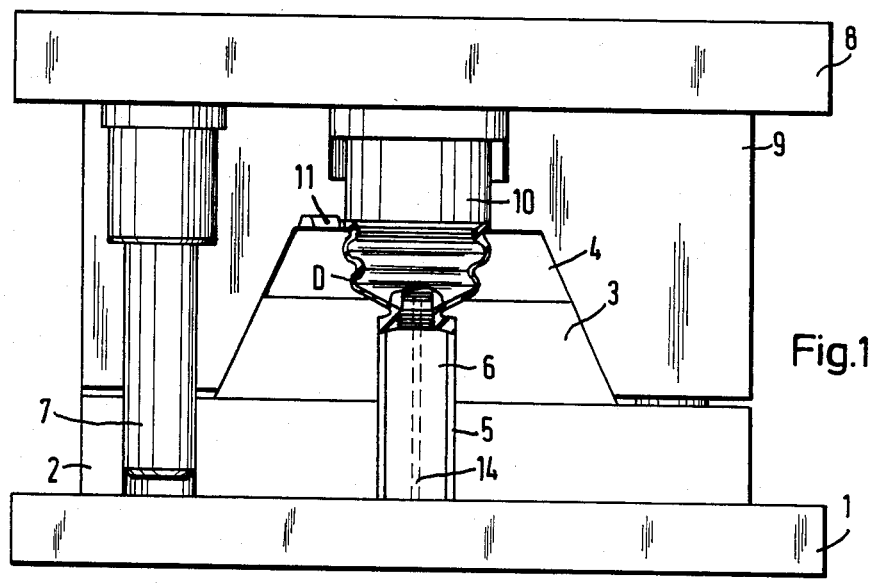
FIG. 1 shows an injection device during the injection process, partially in section, seen in side view.

The embodiment shown has a mold clamping plate 1 on which there is fastened a base plate 2. On this base plate 2 there are movably guided both a lower pair of followers 3 and an upper pair of followers 4 which are divided in the center and can be opened and closed independently of each other. There are also arranged on the base plate 2 a shaped ejection sleeve 5 and a lower core plunger part 6 which are movable relative to each other. In the embodiment shown in the drawing, the lower core plunger part is stationary while the shaped ejector sleeve 5 is displaceable in longitudinal direction relative to the core plunger part 6 and thus to the base plate 2.

By means of two guide rods 7, a cover part 8 is guided on the base plate 2 and thus on the mold clamping plate 1, said cover plate being provided with a carrier plate 9. This carrier plate 9 serves, on its part, for the mounting and guiding of an upper core plunger part 10 which is displaceable in its longitudinal direction with respect to the carrier plate 9. In order to guide the cover plate 8 together with the parts arranged on it relative to the mold clamping plate 1, even when the injection mold is completely open, further guide means are provided, they, however, having been omitted from the drawing in order not to clutter it.

By the shape of the centrally divided lower and upper follower pairs 3 and 4 the outer contour is formed on the outer surface of the sealing element which is to be produced, for instance, by an injection process from resilient synthetic resin. As example of such a sealing element D, a double-folded bellows has been shown, such as used for ball joints in automobile construction. As can be noted in particular from FIG. 4, the upper pair of followers 4 is provided with two projections V1 and V2 and the lower pair of followers 3 with one projection V3 in order to produce this outer contour. These projections V1, V2 and V3 result in outer undercuts H1, H2 and H3 respectively on the sealing element D to be produced. In order to obtain a uniform wall thickness of the sealing element D, the upper core plunger part 10 is also provided with annular projections V4 and V5 which in their turn result in undercuts H4 and H5 respectively with respect to the inner contour of the sealing element D.

The inner contour of the sealing element D is formed not only by the upper core plunger part 10 but also by the lower core plunger part 6 which is provided with a plurality of ribs in order to form the smaller axial opening of the sealing element D. Finally, the upper core plunger part 10 forms the edge closure at the end of the larger axial opening of the sealing element D. The opposite end closure of the sealing element D is formed not only by the lower core plunger part 6 in an outer annular region but also by the end surface of the shaped ejection sleeve 5.

The connecting of the hollow space formed by the parts 3, 4, 5, 6 and 10 for the injecting of the sealing element D is effected by a connection piece 11 which is arranged above the upper pair of followers 4 on the carrier plate 9 so that the injection material is introduced into the cavity of the injection mold within the region of the edge of the larger axial opening of the sealing element D.

In order to obtain a dependable guidance of the lower core plunger part 6 on the upper core plunger part 10 during the injection process, the lower core plunger part 6 is provided with a pin 12 which engages into a corresponding depression 13 in the upper core plunger part 10 when the device is closed. The pin 12 and the depression 13 can best be noted from FIG. 4. Their cooperation can be most clearly noted from FIG. 1.

Figure 2:
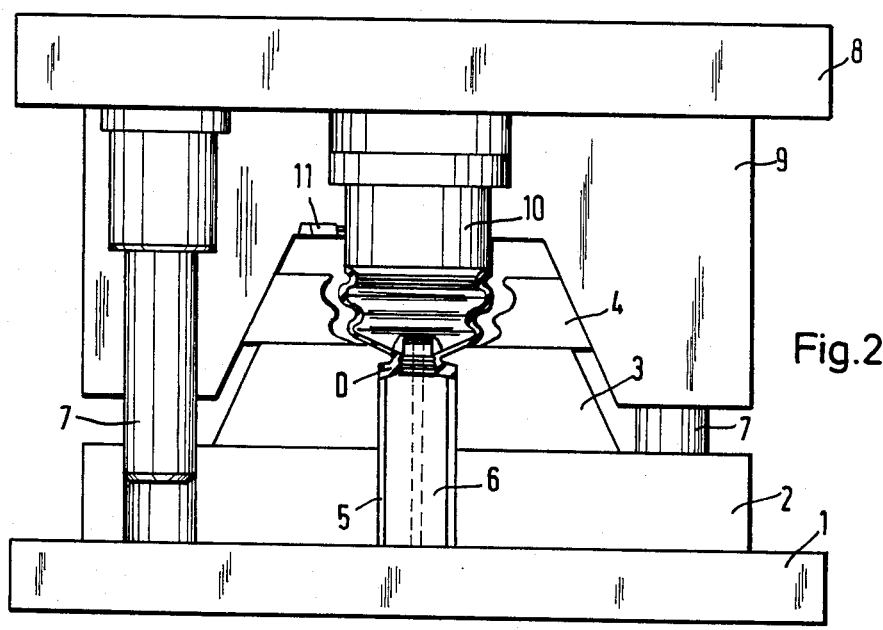
FIG. 2 shows this same injection device after the opening of the upper pair of followers.

FIG. 1 also shows the position of the individual parts of the injection mold during the injection process. As soon as this injection process is at an end and the sealing element D produced has solidified in the required manner, the cover plate 8 is lifted slightly as a first step for the removal of the sealing element from the mold, as shown in FIG. 2. In this connection, the upper core plunger part 10 remains in its position while the upper pair of followers 4 is opened.

Figure 3:
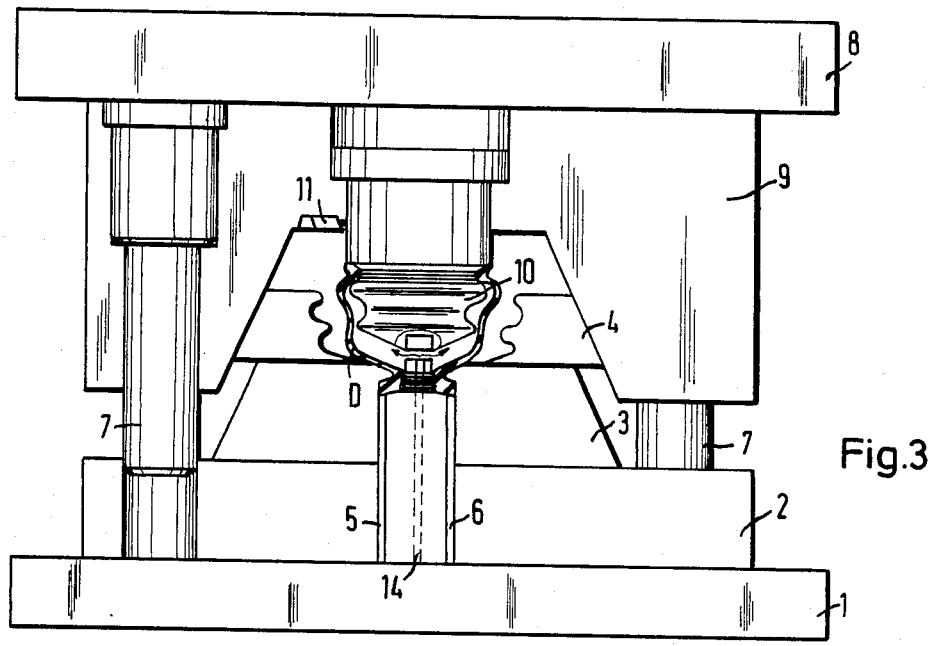
FIG. 3 shows this same injection device during the pulling out of the upper core plunger part.

Then, as shown in FIG. 3, compressed air is fed through a compressed air borehole 14 which extends through the lower core plunger part 6 up into the parting plane between the upper and lower core plunger parts 10 and 6 respectively in order to widen the sealing element D in the manner desired, as is also shown in FIG. 3. In this connection, as a result of a further movement of the cover plate 8 the upper core plunger part 10 is lifted slightly from the lower core plunger part 6.

Figure 4:
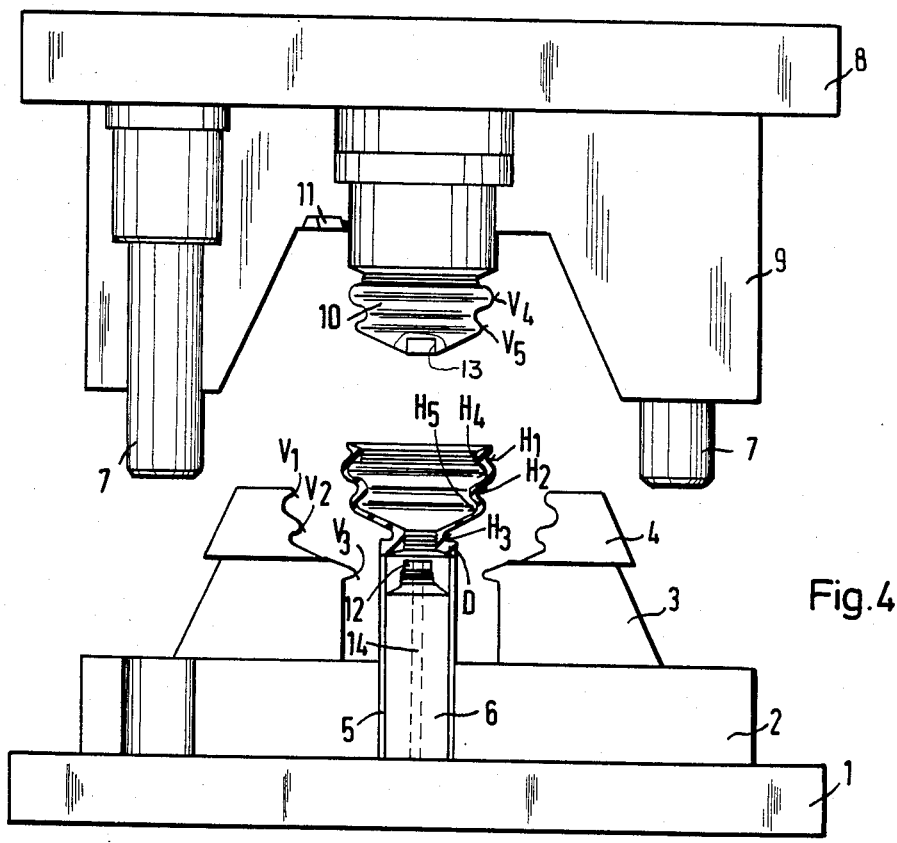
FIG. 4 shows this same injection device in completely open condition.

Upon this lifting of the upper core plunger part 10 the sealing element D remains clamped between the lower pair of followers 3, which remains in the closed position, and in the lower plunger part 6 and the shaped ejection sleeve 5. Even upon the complete pulling of the upper core plunger part 10 out of the sealing element D this clamping is retained. Only after the upper core plunger part 10 has completely left the sealing element D, as shown in FIG. 4, is the lower pair of followers 3 opened. The shaped ejection sleeve 5 then carries out a movement relative to the lower core plunger part 6 so that the main part of the end surface of the sealing element D is lifted from the lower core plunger part 6 whereupon the sealing element D can be automatically ejected without difficulty from the completely open injection mold.

In the mold removal process described above neither the use of a parting agent such as, for instance, silicon is necessary nor is the sealing element D subjected to impermissible stresses which could lead to permanent deformations. Since the sealing element D has its final shape also in the region of its two axial openings, no additional work is necessary.

As soon as the sealing element D has left the open injection mold, the parts of the mold are moved back into the position shown in FIG. 1. The injection mold is then available for a new injection.

By the separation of the followers, which are centrally divided in the longitudinal direction of the sealing element D into a lower pair of followers 3 and an upper pair of followers 4, and by the use of a shaped ejection sleeve 5, the sealing element D can be automatically removed from the mold in the manner described above. The separation between the lower pair of followers 3 and the upper pair of followers 4 takes place in this connection in a region which lies between the inner undercut H5 of smallest diameter and the outer undercut H3 of smallest diameter. Regardless of the shape of the specific sealing element D it is possible, by a separating of the pairs of followers 3 and 4 in this region to hold the sealing element D fast after the opening of the upper pair of followers 4 by means of the closed lower pair of followers 3 while the upper core plunger part 10 is pulled out of the sealing element D.

We claim:

1. In an injection mold for the manufacture of a sealing element of elastic material which has outer and inner undercuts, having followers which are divided centrally in a longitudinal direction of the sealing element and correspondingly form an outer contour of the sealing element, the mold including a core plunger which correspondingly forms an inner contour of the sealing element and is divided into an upper core plunger part and a lower core plunger part which are movable longitudinally relative to each other and from which the sealing element is removed after the opening of the followers, the improvement in combination wherein said followers are divided further in a transverse direction in the region between the inner of the undercuts of smallest diameter and the outer of the undercuts of smallest diameter into an upper pair of said followers and a lower pair of said followers, each of said upper and lower pairs of followers are movable transversely to the longitudinal direction independently of each other, and wherein said mold further comprises an ejection sleeve, the lower core plunger part being guided in said ejection sleeve, said sleeve being movable relative to the lower core plunger part and with an end surface thereof forming a part of the outer contour of an end surface of the sealing element, and means for simultaneously feeding compressed air for expanding the sealing element when said one of said pairs of followers open for initiation of automatic removal of the sealing element from one of the core plunger parts adjacent said one of said pairs of followers when the other of said pairs of followers is closed and holding the sealing element firmly sealed on the other core plunger part.

2. The mold according to claim 1, wherein
one of said core plunger parts includes a pin,
the other of said core plunger parts is formed with a depression for receiving said pin during a closing of the mold,
said pin being oriented along an axis of said one core plunger part and being located within the sealing element formed by the mold.

3. The mold according to claim 1, wherein
said one core plunger part is said lower core plunger part and said other core plunger part is said upper core plunger part.

4. The mold according to claim 1, wherein
said upper follower pair and said lower follower pair are disposed slidably along respectively abutting surfaces thereof transverse to the longitudinal direction of the sealing element to be produced by said mold.

5. The mold according to claim 1, wherein
one of said follower pairs forms said outer undercut of smallest diameter and said core plunger adjacent the other of said follower pairs forms said inner undercut of smallest diameter.

6. The mold according to claim 1, wherein
said means elastically expands said sealing element.

7. The mold according to claim 1, wherein
said means feeds said compressed air through said other core plunger part.

8. The mold according to claim 1, wherein
said one of said pairs of followers is the upper pair of followers, and said one of the core plunger parts is said upper core plunger part.

9. The mold according to claim 7, wherein
said one of said pairs of followers is the upper pair of followers, and said one of the core plunger parts is said upper core plunger part.

10. The mold according to claim 7, wherein
said means is for simultaneously feeding compressed air when said one core plunger part is slightly longitudinally moved away from said other core plunger part.

\* \* \* \* \*